United States Patent [19]

Schall

[11] 4,061,390
[45] Dec. 6, 1977

[54] ELEVATING ASSEMBLY FOR THE UPPER PLATFORM OF A ROAD TRANSPORT VEHICLE CARRIER

[75] Inventor: Roger Schall, Kirchheim, France

[73] Assignee: Lohr-Construction de Vehicules Industriels S.A., Hangenbieten, France

[21] Appl. No.: 703,700

[22] Filed: July 8, 1976

[30] Foreign Application Priority Data

July 8, 1975 France ................................ 75.22906

[51] Int. Cl.² .............................................. B60P 3/08
[52] U.S. Cl. .................................................... 296/1 A
[58] Field of Search .......................... 105/273, 368 R; 296/1 A; 298/22 D; 214/512; 254/124

[56] References Cited

U.S. PATENT DOCUMENTS 3,913,496 10/1975 Lohr ................................ 105/368 R

FOREIGN PATENT DOCUMENTS 1,201,385 9/1965 Germany .......................... 105/368 R

*Primary Examiner*—Robert G. Sheridan
*Attorney, Agent, or Firm*—Young & Thompson

[57] ABSTRACT

An improved elevating assembly for the upper platform of a road transport vehicle carrier, of the type having an upper platform supported on a plurality of front and rear posts which in turn are supported on the lower platform. The lower ends of the front and rear posts are mounted for movement lengthwise along the lower platform thereby to raise and lower both the front end and the rear end of the upper platform. A strut is pivotally connected at its upper end to a point intermediate the length of each post. In the present invention, the strut is a bell crank lever pivotally interconnected at its elbow to the lower platform and at its lower end pivotally interconnected with one end of a ram that is pivotally connected at its other end to the platform. The ram contracts to raise the upper end of the strut and has lost-motion connection with the strut.

4 Claims, 3 Drawing Figures

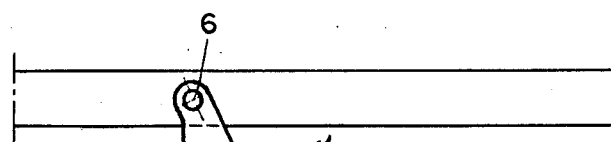
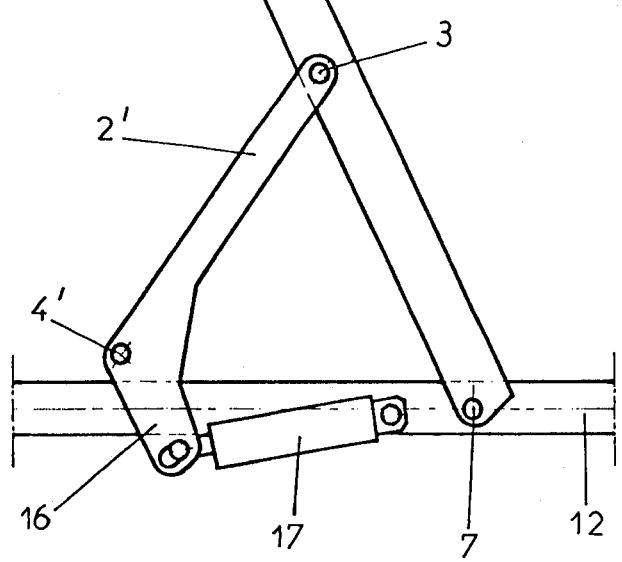

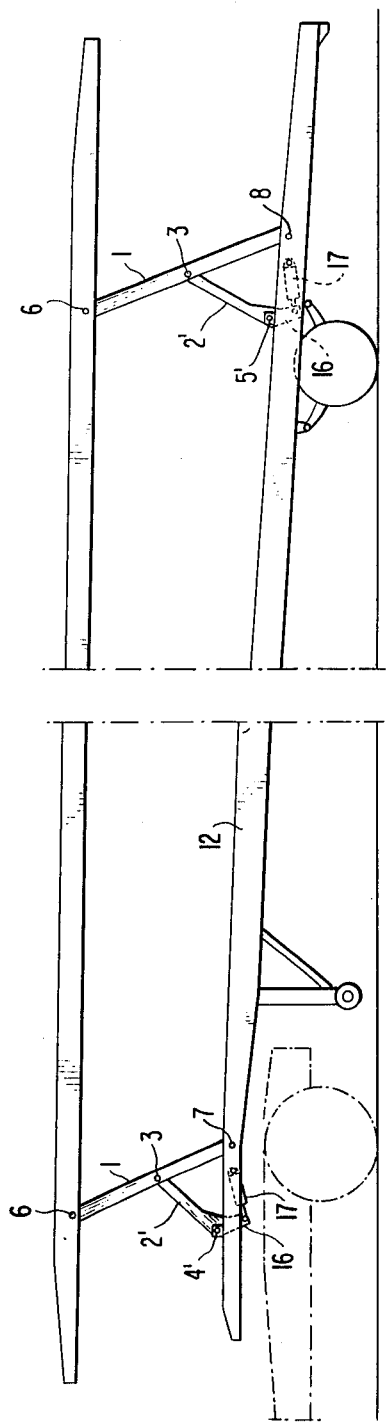

ELEVATING ASSEMBLY FOR THE UPPER PLATFORM OF A ROAD TRANSPORT VEHICLE CARRIER

The present invention relates to an elevating assembly for the upper platform of a road transport vehicle carrier of the type disclosed in U.S. Pat. No. 3,913,496, Oct. 21, 1975, whose disclosure is incorporated herein by reference.

In such a road transport vehicle carrier, there is provided a lower platform beneath an upper platform which can be raised and lowered, and support posts extending from the lower platform to support the upper platform at such a height that vehicles can be accommodated on both platforms when vehicles are being transported on the carrier. Such a carrier is usually in the form of a semi-trailer.

Vehicle carriers of this type have their support posts pivotally connected at their upper ends to the upper platform and at their lower ends to slide means which slide along a slideway on the lower platform during raising and lowering of the upper platform, the support posts lying along the lower platform when the upper platform is fully lowered. In the type of carrier of the above-identified patent, with which the present invention is concerned, there is a strut which at its upper end is pivotally interconnected to a point intermediate the length of each support post and at a lower point is pivotally connected to the lower platform, this pivotal interconnection being at the lower end of the strut in the above-identified patent.

The present invention comprises an improvement in the structure described above and disclosed in the above-identified patent, which facilitates the construction or operation of the device. Accordingly, the object of the present invention is to effect this improvement.

According to the present invention, there is provided a vehicle carrier having the overall construction described above, and particularly characterized in that each strut which is pivotally connected at its upper end to the respective support post, has an extension arm that extends beyond its pivotal connection to the lower platform, and a ram that acts on the extension for raising and lowering the upper platform.

Other objects, features and advantages of the present invention will become apparent from a consideration of the following description, taken in connection with the accompanying drawings, in which:

FIG. 1 is a side elevational view of an elevating assembly according to the present invention, with the support post in its raised position;

FIG. 2 is a view similar to FIG. 1 but with the support post in its lower position.

FIG. 3 is a partial diagrammatic profile view of a vehicle-carrier train the upper platform of which is in the raised position.

In the drawings, the reference numerals 1, 3, 6, 7 and 12 identify the same parts as do those same reference numerals in the above-identified patent. The reference numerals 2' and 4' identify modifications of the structure shown at 2 and 4 in that patent; while the reference numerals 16 and 17 identify structure having no exact counterpart in that patent.

Referring now to the drawings in greater detail, there is shown an elevating assembly according to the present invention comprising a strut 2' pivotally connected by the pivot pin 3 to the post 1 and by the pivot pin 4' to the lower platform, strut 2' being extended by an extension arm 16 which is slightly oblique with reference to the strut 2', and at the extremity of which extension arm 16 there acts a ram 17. The lower extremity of the post 1 is guided in a double slideway 12 on the lower platform by means of slide shoes, not shown, connected to its pivot pin 7.

The arrangement described above functions in the following manner: when the post 1 is in the position represented in FIG. 2, in order to raise it into the elevated position, the ram 17 is actuated so that it pulls on the arm 16. By this action on the arm 16 the strut 2' turns about its pivot pin 4' and by the reaction at its pivot pin 3 tends to raise the post 1, of which the lower part moves in the direction of the arrow F'. As soon as the ram 17 arrives at the end of its contracting travel the post 1 is locked in position, in known manner.

Due to this position of the ram 17 with respect to the arm 16 of the strut 2' it is possible to reduce substantially the forces necessary to elevate the post 1, and, consequently, to raise the upper platform.

It can be seen that each strut 2' together with its extension arm 16 constitutes a bell-crank lever. As shown, there is a slot which allows some lost motion in the connection between the ram 17 and the extension arm 16; obviously a pivot pin on the arm 16 could engage in a slotted element secured to the piston rod of the ram 17 in order to obtain the same effect, namely to allow for manufacturing tolerances.

It is preferable if the ram 17 extends to lower the upper platform and contracts to raise the upper platform, as in the illustrated arrangement, but a reverse action would be feasible.

As indicated above, the over-all configuration of the device according to the present invention is the same as in the above-identified U.S. Pat. No. 3,913,496. Thus, FIG. 3 shows the same over-all configuration, and indicates the relationship of the novel structure of the present invention relative thereto.

From a consideration of the foregoing disclosure, therefore, it will be evident that the initially recited object of the present invention has been achieved.

Although the present invention has been described and illustrated in connection with preferred embodiments, it is to be understood that modifications and variations may be resorted to without departing from the spirit of the invention, as those skilled in the art will readily understand. Such modifications and variations are considered to be within the purview and scope of the present invention as defined by the appended claims.

I claim:

1. In a road transport vehicle carrier having a lower platform and an upper platform and support posts extending from the lower platform to support the upper platform at such a height that vehicles can be accommodated on both platforms when vehicles are being transported on the carrier, the upper ends of the posts being pivotally connected to the upper platform and the lower ends of the posts being movable lengthwise along the lower platform thereby to raise and lower the upper platform, and a strut pivotally connected at its upper end to each post and pivotally connected to the lower platform at a distance from its upper end; the improvement in which the strut is pivotally interconnected with the lower platform intermediate its ends and has an extension arm beyond its pivotal connection to the lower platform, and a ram acting between said extension arm and the lower platform to raise and lower the upper platform.

2. A carrier as claimed in claim 1, each said strut with its extension arm comprising a bell-crank lever that opens in the direction of the lower end of the associated post.

3. A carrier as claimed in claim 1, and a slotted lost-motion connection between the ram and the extension arm.

4. A carrier as claimed in claim 1, in which the ram extends to lower the upper platform and contracts to raise the upper platform.

* * * * *